United States Patent
Ogino et al.

[11] 4,214,814
[45] Jul. 29, 1980

[54] VARIABLE SOFT FOCUS LENS SYSTEM

[75] Inventors: Shuji Ogino, Osaka; Toshinobu Ogura, Tondabayashi; Yukio Okano, Osaka; Akiyoshi Nakamura, Sakai, all of Japan

[73] Assignee: Minolta Camera Kabushiki Kaisha, Osaka, Japan

[21] Appl. No.: 884,357

[22] Filed: Mar. 7, 1978

[30] Foreign Application Priority Data

Mar. 7, 1977 [JP] Japan .................. 52/24964

[51] Int. Cl.² .................. G02B 13/20; G02B 9/60; G02B 9/64
[52] U.S. Cl. .................. 350/188; 350/214; 350/216
[58] Field of Search .............. 350/188, 215, 216, 214

[56] References Cited

U.S. PATENT DOCUMENTS

| 4,029,396 | 6/1977 | Shenker | 350/188 |
| 4,124,276 | 11/1978 | Okano et al. | 350/188 |

*Primary Examiner*—Conrad J. Clark
*Attorney, Agent, or Firm*—Jackson, Jones & Price

[57] ABSTRACT

A variable soft focus lens system particularly adapted for photography is disclosed. The lens system incorporates two lens groups, a first object side lens group having an image side, rearmost surface convex to the image side, and a second, image side lens group having an object side, foremost surface concave to the object side. An airspace separating the first and second lens group has a meniscus shape concave to the object side. A good quality soft tone image having undersirable aberrations well within tolerable limits, is attained by shifting at least the second lens group along the optical axis relative to the first lens group whereby the airspace separating the two lens groups and a spherical aberration of the entire lens system is varied. An image does not lose proper focus while the spherical aberration of the system is varied. The second lens group has a refractive power within specified limits in relation to the refractive power of the entire lens system.

14 Claims, 15 Drawing Figures

Spherical Aberration
Sine Condition

Astigmatism

Spherical Aberration
Sine Condition

Astigmatism

Spherical Aberration
Sine Condition

Astigmatism

Spherical Aberration
Sine Condition

Astigmatism

Spherical Aberration
Sine Condition

Astigmatism

Spherical Aberration
Sine Condition

Astigmatism

VARIABLE SOFT FOCUS LENS SYSTEM

BACKGROUND OF THE INVENTION

1. Field of the Invention

This invention relates to a soft focus lens system, and more particularly to a soft focus lens system for use in photography wherein the image quality is capable of being altered to achieve a desired degree of softness as a result of varied spherical aberration of the lens system.

2. Brief Description of the Prior Art

Soft focus lens systems have been used in photography for a considerable period of time. Various different soft focus lens systems have been suggested such as those disclosed in U.S. Pat. No. 2,233,591; U.S. Pat. No. 1,370,885; U.S. Pat. No. 3,843,235; U.S. Pat. No. 3,397,023; U.S. Pat. No. 3,045,530; U.S. Pat. No. 2,959,105; U.S. Pat. No. 3,476,457; U.S. Pat. No. 1,463,132 and U.S. Pat. No. 1,446,634. U.S. Pat. No. 2,381,098 discloses a lens system wherein movement of the lenses may introduce or remove softness of an image.

One of the known ways of designing a soft focus lens system is to intentionally increase the amount of spherical aberration beyond the normal tolerance limits acceptable in sharp focus photography.

Some soft focus lenses known in the prior art have been designed to permit variation of the spherical aberration of the lens system thereby allowing the photographer to obtain a desired degree of softness of a photographic image.

Such prior art lenses with variable spherical aberration usually comprise a three-group lens system having an intermediate negative lens group, shiftable along an optical axis, and a lens system including a shiftable front element, the latter being disclosed in British Pat. No. 198,569, published June 7, 1923.

Generally in order to obtain a soft focus image, it is sufficient to generate only a large spherical aberration, with other undesirable optical phenomena such as astigmatism, coma and other aberrations preferably being corrected as it is conventionally done in ordinary photographic lenses. The prior art systems have not enabled one to obtain an entirely satisfactory soft-focus picture because varying the spherical aberration is usually accompanied by deteriorations in other aberrations, thus rendering a resulting picture more or less indistinguishable from a picture taken with a poorly compensated lens. Furthermore, since shifting of any lens group to vary the spherical aberration brings the lens system out of focus, it has been necessary to refocus the lens system every time a change in the spherical aberration has been made as the lens system was adjusted to obtain the desired degree of softness. It can be readily appreciated that adjustment of the focus of the entire lens system can be difficult when viewing a soft tone image through a viewfinder.

The ordinary soft focus lens of the prior art having a preset non-variable spherical aberration, is always in a soft-focus condition and, as a result does not lend itself well to focusing when it is used as a lens for a single reflex camera.

Improvements in the design of soft focus lens systems including the feature of variable spherical aberration were suggested by U.S. Pat. No. 4,124,276 issued on Nov. 7, 1978 which is assigned to the same assignee as the present application. The variable soft focus lens systems disclosed in that patent require however, that at least two lens groups be shifted at different rates along the optical axis as a variation in the spherical aberration is made, as shifting only one of the lens groups so as to create a soft image would result in an unacceptable defocusing of the image. Shifting two or more lens groups at a differential speed, as it is necessary in that system, however requires an elaborate mechanism.

SUMMARY OF THE INVENTION

It is an object of this invention to provide a variable soft focus lens system wherein the amount of spherical aberration is variable while other aberrations are properly corrected.

It is another object of this invention to provide a variable soft focus lens system of simple construction which permits selective variation in spherical aberration while maintaining the object in focus.

It is still another object of this invention to provide a variable soft focus lens system wherein, with the object being maintained in focus, the spherical aberration can be selectively varied by shifting only a single lens group.

The above stated and other objects and advantages are attained by a lens system having two lens groups separated from each other by an airspace. A first lens group has an image side surface convex to the image side and a second lens group has an object side surface concave to the object side. The airspace between the first and second lens group has the shape of a meniscus concave to the object side.

The lens group on the image side has a refractive power limited to a small value within a range defined by the formula $$0.5\Phi > \Phi_B > -0.3\Phi$$

wherein $\Phi$ is the refractive power of the entire lens system and $\Phi_B$ is the refractive power of the lens group being located on the image side.

The spherical aberration of the entire lens system may be varied, and therefore may be adjusted to attain a desired degree of softness of the image by moving the image side lens group along the optical axis and thereby increasing or decreasing the meniscus shaped airspace between the two lens groups. Focus of the image is maintained while the spherical aberration and thus the desired degree of softness is selected.

The design of the lens system of this invention permit a rather simple construction of a barrel in which the lens system is mounted, as only the second, image side lens group is shifted when the spherical aberration is adjusted. The desired spherical aberration and hence the softness of the image is attained in this lens system while other undesirable optical phenomena such as astigmatism are minimized thereby providing a good quality soft picture.

The object side lens group of the present invention may be of any type such as those of the Tessar, triplet or Gauss type while the second, image side lens group preferably comprises two lenses.

The features of the present invention which are believed to be novel are set forth in particularity in the appended claims. The present invention, both as to its organization and manner of operation, together with further objects and advantages thereof, may be best understood by reference to the following description taken in conjunction with the accompanying drawings.

DESCRIPTION OF THE PREFERRED EMBODIMENTS

The following description is provided to enable any person skilled in the optical arts to make and use the invention and sets forth the best modes contemplated by the inventors of carrying out their invention. Various modifications, however, will remain readily apparent to those skilled in the art, since the generic principles of the present invention have been defined herein specifically to provide a soft focus optical lens system that can be manufactured in a relatively economical manner.

In the accompanying drawings which are further supplemented by the enclosed tables, the lenses in accordance with the present invention are illustrated diagrammatically with light being assumed to travel from left to right. Lens groups are designated with capital letters. The radii of curvature of the lenses is indicated by r, with a subscript indicating the lens group in capital letter, and an arabic numeral indicating the radius numbered from left to right in the group. When two adjacent cemented lenses have the same radius, only one radius is indicated in the tables.

Figure 1:
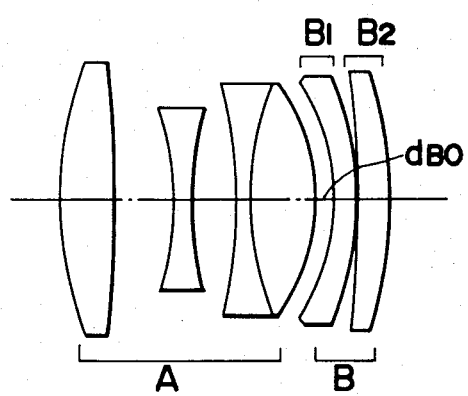
FIG. 1 is a schematic view of a first preferred embodiment of the present invention.

The construction of a first preferred embodiment is schematically illustrated in FIG. 1, and the pertinent data of this first preferred embodiment are disclosed in Table 1. The lens system of this first preferred embodiment comprises, proceeding from the object side, a first lens group A and a second lens group B separated from each other by a variable airspace $d_{BO}$. The airspace $d_{BO}$ is located between two surfaces concave to the point where the "off-axial principal ray" intersects the optical axis in the first lens group. Throughout this specification, the term "off-axial principal ray" means the ray in the center of the meridional pencil which has a field angle equal to one half of the maximum field angle when the lens system is in full-aperture condition. The position where the off-axial principal ray intersects the optical axis is the position in which the aperture stop is normally located. Stated differently, the airspace $d_{BO}$ has the shape of a meniscus concave to the object side.

The object of providing an airspace with the shape of a meniscus concave to the object side is conveniently attained by the design incorporated in the first preferred embodiment where the radius of curvature of the front object side surface of the first lens of the second lens group has a smaller absolute value than the radius of curvature of the rear image side surface of the last lens of the first lens group. Thus, referring to Table 1 the condition $$|r_{B1}| < |r_{A7}| \quad (1)$$

is satisfied with both $r_{B1}$ and $r_{A7}$ having a negative actual value.

Furthermore, it is an essential feature of this invention that the refractive power $\Phi_B$ of second lens group B and the refractive power $\Phi$ of the entire system have the following relation:

$$0.5\Phi > \Phi_B > -0.3\Phi \quad (2)$$

Figure 2A:
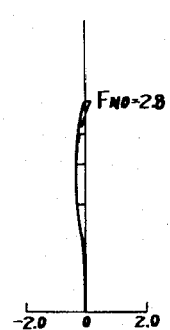
FIGS. 2a and 2b are respectively, graphical plots of the spherical aberration and astigmatism of the lens system of the first preferred embodiment with the lens system being set in a normal focus condition.
Figure 2B:
Figure 3A:
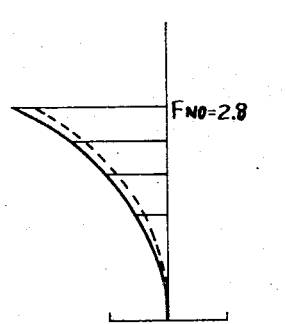
FIGS. 3a and 3b are respectively, graphical plots of the spherical aberration and astigmatism of the lens system of the first preferred embodiment with the lens system being set in a soft focus condition.
Figure 3B:

The dimensions of the airspace $d_{BO}$ in Table 1 represent the airspace in the normal mode, i.e., when the spherical aberration has been corrected as in an ordinary lens, and the system is in condition for sharp focusing. The spherical aberration and astigmatism in this sharp focus condition are shown in FIGS. 2a and 2b. When soft focusing is desired, the airspace $d_{BO}$ is increased by shifting the second lens group B along the optical axis causing an under-correction of the spherical aberration. The spherical aberration and astigmatism when the airspace $d_{BO}=8.24$, and hence the system is in a soft focus condition, are shown in FIGS. 3a and 3b. Comparison of FIGS. 2a and 2b with FIGS. 3a and 3b indicates that whereas a variation in the airspace $d_{BO}$ results in a large change in spherical aberration, astigmatism is affected only to a small extent, thus allowing soft focus photography with other undesirable optical characteristics such as astigmatism still being well within tolerable limits.

The above described variation in spherical aberration is brought about by the following. Since the first lens group A has an overall positive refractive power, a variation in airspace $d_{BO}$ results in a variation in the height of incidence of Rand ray on the object side surface $r_{B1}$ of the first lens of the second lens group B. In normal condition with the lens system set for sharp focusing, the under-correction in spherical aberration generated at the image side surface $r_{A7}$ of the last lens of the first lens group A is cancelled by an over-correction in spherical aberration generated at the surface $r_{B1}$ to provide an adequate correction in spherical aberration comparable to that of an ordinary lens system. The above is illustrated in the graph of FIG. 2a. However, an increase of the airspace from the normal space $d_{BO}$, as when the lens system is set for soft focus, results in a reduced height of incidence of Rand ray on the surface $r_{B1}$ and, hence, the over correction of spherical aberration at the surface $r_{B1}$ is diminished. As a result, an under-correction in spherical aberration is created in the entire lens system as shown in FIG. 3a.

Conversely, when the airspace $d_{BO}$ is diminished from its normal size, an over-correction in spherical aberration is generated in the whole system, again causing a soft focus image.

In varying the spherical aberration as described above, if the amount of shift of the second lens group B along the optical axis is approximately equal to the amount of change in back focal length, an acceptable focus can be maintained over the desired range of variation in spherical abberation. Stated differently, by shifting the second lens group B alone, and keeping the first lens group A stationary, the spherical aberration can be varied with the focus of the entire lens system being maintained. The fact that only the second lens group B needs to shift to affect soft focusing permits a very simple mechanical construction of a lens barrel.

However, the formula 2 set forth above, defining the relation of the refractive power $\Phi_B$ of the second lens group B to the refractive power $\Phi$ of the entire lens system must be satisfied in order to realize the above result. Qualitatively speaking this formula requires that the absolute value of refractive power of the second lens group B be limited, within a specified range, to be sufficiently small in relation to the refractive power of the entire lens system.

This essential requirement of the present invention concerning the respective refractive powers of the entire lens system and of the second lens group will be best understood when the following is considered. In a thin lens system if the refractive power of the second lens group was zero, $\Phi_B = 0$, the distance of the final image point of the whole lens system from the first lens group A would not be affected by moving the intervening second lens group along the optical axis.

However in a practical lens system composed of thick lens elements, a shift of the second lens group B generally results in a variation of the distance of the image point from the first lens group A even when $\Phi_B = 0.0$. Moreover, there are cases in which, when the spherical aberration is either under-corrected or over-corrected, a better image can be obtained if a film plane is set at a position displaced from the paraxial image point by a certain distance so as to place the film plane in an in-focus condition. For the above reasons, it is preferable in a practical system composed of thick lens elements, to provide the second lens group B with a suitable refractive power in order to obtain a suitable relation between the shift of second lens group B along the optical axis and the variation in back focal length and thereby to maintain a desired focus notwithstanding a shift of the second lens group B.

The refractive power which is given to the second lens group B is selected according to the lens type of the group B. It is based on an overall evaluation of such factors as the extent of movement of second lens group B along the optical axis, the change in back focal length attributable to the movement of the second lens group B, and the amount of spherical aberration generated, and the position of the film plane that is suited to that amount. Computation of the formulae required to accomplish this selection may be carried out with the assistance of a computer. For example in the first preferred embodiment $\Phi_B = 0.000425$ and $\Phi = 0.01$, when $d_{BO}$ is varied from the value of 3.53 set forth in Table 1 to 8.24, the amount of shift of the second lens group B is 4.71. The back focal length is 87.38 when $d_{BO} = 3.53$ and 82.30 when $d_{BO} = 8.24$, the amount of change in the back focal length being 5.08.

In order to further illustrate the importance of adhering to the formula $$0.5\Phi > \Phi_B > -0.3\Phi \tag{2}$$

for the lens system of this invention to function properly and accomplish its stated objective, the following examples, wherein the formula is not satisfied, are illustrated.

Let it be assumed that the second lens group B has a negative high refractive power beyond the lower limit set forth by formula 2. Thus, $\Phi_B < -0.3\Phi$. In this case in the paraxial region, the amount of variation in the back focal length is greater than the amount of shift of the second lens group B and, in the soft-focus condition, the distance from the first lens group A to the paraxial image point is considerable shorter than in the normal condition. Therefore, the image on the film plane in such a soft-focus mode becomes undesirably blurred in the shape of a doughnut. In order to maintain a focus under such circumstances, the first lens group A must also be shifted along the optical axis together with the second lens group B albeit to a different extent.

As it can be readily appreciated simultaneously moving the two lens groups along the optical axis at a different rate requires an elaborate mechanism which is in conflict with the stated objects of this invention.

Let is be assumed, on the other hand, that the second lens group B has a positive high refractive power which exceeds one half of the refractive power of the whole lens system, thus $\Phi_B > 0.5\Phi$. In this case, the amount of variation in back focal length is smaller than the amount of shift of second lens group B in the paraxial region and, in the soft-focus mode, the distance from the first lens group A to the paraxial image point becomes considerably greater than in the normal mode. Consequently, the image on the film plane on the soft mode cannot have the desired quality of a soft focus picture. Furthermore, in this case too, in order to maintain a focus the first lens group A must also be shifted together with the second lens group B. As pointed out above this is contrary to the objects of this invention.

In order to hold the refractive power of the second lens group B within the range set forth by formula 2, it is advantageous and effective to construct the second lens group B of two distinct lenses or two distinct lens sub-groups. Accordingly, the first preferred embodiment of the present invention incorporates a negative meniscus lens component $B_1$ having a surface concave to the object side and a positive lens component $B_2$ having a radius of curvature on its object side surface larger in absolute value than the absolute value of the radius of curvature on its image side surface which is convex to the image side. Stated differently, the lens $B_2$ which is the most remote lens of the entire system from the object side, has a positive refractive power and, referring to Table 1, its two surfaces satisfy the condition $$|r_{B3}| > |r_{B4}| \tag{3}$$

Alternatively the second lens group B might consist of a single meniscus lens but, then, the radii of curvature of the two surfaces of such a meniscus lens could not be sufficiently different if the overall refractive power of second lens group B was to be kept sufficiently low as it is necessary in this invention. As a result of having a single meniscus lens in lens group B with insufficiently different radii of curvature of its two surfaces, the amount of aberration generated in the second lens group B would be too small to attain the desired degree of variability of spherical aberration. The desired degree of variability of spherical aberration could be attained in this system by increasing the thickness of the meniscus lens comprising group B and thereby extending the distance between its two surfaces. However this is undesirable as it would add to the size and weight of the entire lens system.

In contrast to the above, when the second lens group B is composed of two components as in the first preferred embodiment, it is possible to provide a meniscus lens component $B_1$, of relatively high negative refractive power, and to cancel this excess negative power with the positive refractive power of a positive lens component $B_2$ located on the image side thereof. In this preferred construction, the overall refractive power of the second lens group B is reduced to be within the optimal range and sufficient spherical aberration is generated so as to allow soft focusing according to the principles set forth above.

The second positive lens component $B_2$ of lens group B is then designed to satisfy the requirement of formula 3, i.e. that the absolute value of the radius of curvature of its object side surface be larger than the absolute value of the radius of curvature of its image side surface. This is desirable in order to avoid giving a sharp refraction to an off-axial principal ray and to preclude untoward influences in off-axial aberrations such as astigmatism.

Focusing of the lens system of the first preferred embodiment is accomplished by shifting the first and second lens groups A and B along the optical axis as a unit. Strictly speaking, since the second lens group B has a refractive power, a variation in the airspace between lens groups A and B subsequent to initial focusing results in an alteration in the overall focal length of the entire lens system. Stated differently, the overall focal length of the entire lens system is not exactly the same in soft focus condition as in normal condition. However, when the refractive power of second lens group B is sufficiently low as in this invention, the overall focal length of the lens system may be regarded as practically constant irrespective of variations in airspace $d_{BO}$. Thus after having properly focused an object in normal mode a desired degree of softness can be attained and it is unnecessary to refocus the system in soft mode.

It should be understood that if the difference in focal lengths between the normal and soft modes for the same object was to exceed the practically tolerable range the system may be constructed to accomplish focusing by shifting a part of the first lens group A, instead of shifting the entire lens system.

Tables 2 and 3 below disclose optical data of other preferred embodiments of this invention.

Figure 4:
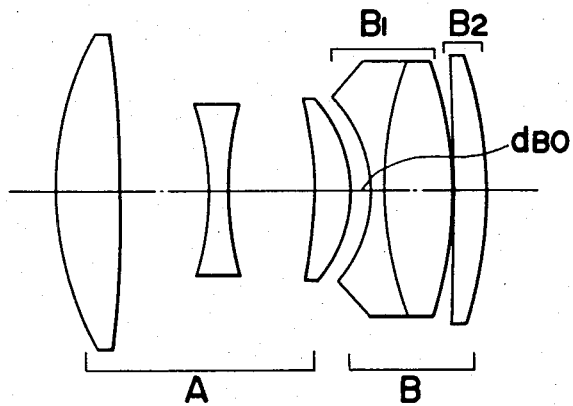
FIG. 4 is a schematic view of a second preferred embodiment of the present invention.

Table 2 represents embodiment 2 of this invention, and FIG. 4 is a schematic view of the same. Whereas the first preferred embodiment incorporates a Tessar type first lens group the second embodiment employs a triplet type. The second image side lens group B of this second preferred embodiment is designed according to the same general principles as lens group B of the first embodiment, but it differs therefrom in that here the first object side component of lens group B comprises two lenses cemented together. The changes in aberrations between the normal and soft modes of focusing are similar to those in the first embodiment. The aberration diagrams corresponding to the normal and soft modes of focusing are similar to those in the first embodiment.

Figure 5A:
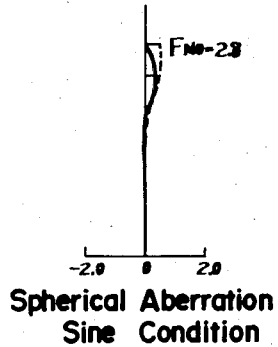
FIGS. 5a and 5b are respectively, graphical plots of the spherical aberration and astigmatism of the lens system of the second preferred embodiment with the lens system being set in a normal focus condition.
Figure 5B:
Figure 6A:
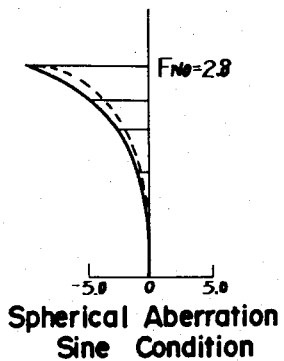
FIGS. 6a and 6b are respectively, graphical plots of the spherical aberration and astigmatism of the lens system of the second preferred embodiment with the lens system being set in a soft focus condition.
Figure 6B:
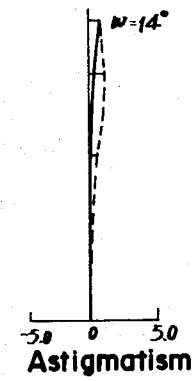

The aberration diagrams corresponding to the normal mode represented by Table 2 are given in FIGS. 5a and 5b, while the aberration diagrams corresponding to the soft mode at $d_{BO}=5.88$ are given in FIGS. 6a and 6b. In the second embodiment, $\Phi_B=0.0017$ when $\Phi=0.01$; the amount of shift of the second lens group B from normal mode to soft mode is 2.35 and the corresponding amount of variation in back focal length is 2.78.

Figure 7:
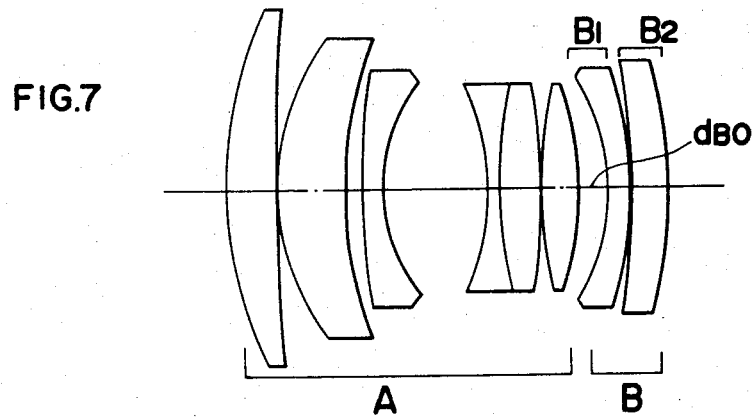
FIG. 7 is a schematic view of a third preferred embodiment of the present invention.
Figure 8A:
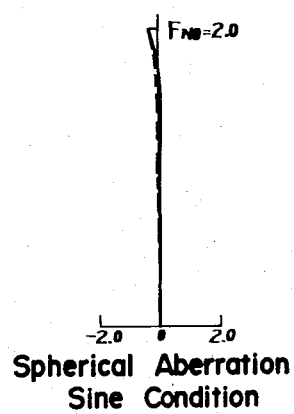
FIGS. 8a and 8b are respectively graphical plots of the spherical aberration and astigmatism of the lens system of the third preferred embodiment with the lens system being set in a normal focus condition.
Figure 8B:
Figure 9A:
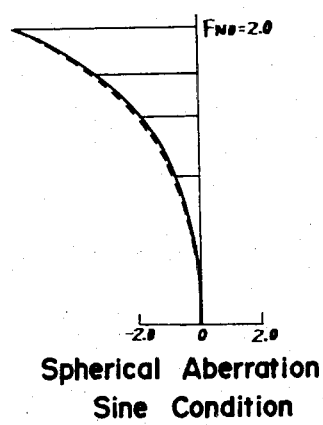
FIGS. 9a and 9b are respectively graphical plots of the spherical aberration and astigmatism of the lens system of the third preferred embodiment with the lens system being set in a soft focus condition.
Figure 9B:
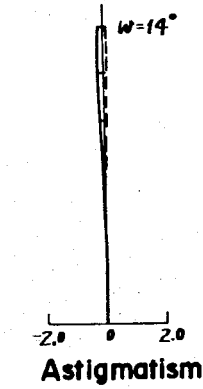

Table 3 discloses data of a third preferred embodiment. This third embodiment which is schematically shown in FIG. 7 is constructed as a higher speed lens having an $F_{NO}$ smaller than that of the first and second embodiments. Here, the construction of first lens group A is of the Gauss type while construction of the second, image side lens group B is essentially the same as in the first embodiment. The aberration diagrams corresponding to the normal mode represented by Table 3 are given in FIGS. 8a and 8b and the aberration diagrams corresponding to the soft mode at $d_{BO}=10.59$ are given in FIGS. 9a and 9b. In this third embodiment $\Phi_B=-0.002375$ when $\Phi=0.01$, and the amount of shift of the second lens group B from the normal mode to the soft mode is 4.71 while the corresponding variation in back focal length is 6.657.

What has been described above is a variable soft focus lens system comprising two lens groups wherein the focus may be set in normal mode and thereafter a desired degree of softness may be attained by simply shifting the rear lens group without the need to simultaneously shift the front lens group or to refocus the entire system.

The optical features of the lens systems built according to this invention permit simple construction of a barrel holding the lenses, and permit the utilization of the lens system for normal as well as soft focus photography. Furthermore, since undesirable aberrations are largely avoided while the desired spherical aberration is adjusted, a soft focus picture of good quality is obtained. The fact that focusing may be accomplished in normal mode and soft mode is obtained only thereafter, represents a significant desirable quality of the lens system of the present invention. Furthermore the spherical aberration generated by the lens system of this invention is relatively lean in the flare component caused by zonal rays and this characteristic is also conducive to obtaining a good quality soft focus picture.

Table 1

(Embodiment 1)
$f = 100.0$   $F_{No.} = 2.8$   $2\omega = 28°$

| | Radius of Curvature | Axial Distance | | Refractive Index | | Abbe Number |
|---|---|---|---|---|---|---|
| A | $r_{A1}$ 63.602 | | | | | |
| | | $d_{A1}$ 8.84 | $N_{A1}$ | 1.7495 | $\nu_{A1}$ | 49.2 |
| | $r_{A2}$ −236.814 | | | | | |
| | | $d_{A2}$ 10.0 | | | | |
| | $r_{A3}$ −47.868 | | | | | |
| | | $d_{A3}$ 3.29 | $N_{A2}$ | 1.6477 | $\nu_{A2}$ | 33.9 |
| | $r_{A4}$ 50.192 | | | | | |
| | | $d_{A4}$ 7.49 | | | | |
| | $r_{A5}$ −80.85 | | | | | |
| | | $d_{A5}$ 2.59 | $N_{A3}$ | 1.5407 | $\nu_{A3}$ | 46.8 |
| | $r_{A6}$ 48.841 | | | | | |
| | | $d_{A6}$ 10.94 | $N_{A4}$ | 1.72 | $\nu_{A4}$ | 50.3 |
| | $r_{A7}$ −34.352 | | | | | |
| | | $d_{BO}$ 3.53 | | | | |
| B | $r_{B1}$ −32.005 | | | | | |
| | | $d_{B1}$ 3.29 | $N_{B1}$ | 1.5762 | $\nu_{B1}$ | 41.4 |
| | $r_{B2}$ −57.007 | | | | | |
| | | $d_{B2}$ 0.12 | | | | |
| | $r_{B3}$ −262.488 | | | | | |
| | | $d_{B3}$ 5.88 | $N_{B2}$ | 1.6935 | $\nu_{B2}$ | 53.4 |

Table 1-continued (Embodiment 1)

f = 100.0    $F_{No.} = 2.8$    $2\omega = 28°$

| Radius of Curvature | Axial Distance | Refractive Index | Abbe Number |
|---|---|---|---|
| $r_{B4}$ −69.722 | | | |

Table 2

(Embodiment 2)

f = 100.0    $F_{No.} = 2.8$    $2\omega = 28°$

| | Radius of Curvature | | Axial Distance | | Refractive Index | | Abbe Number |
|---|---|---|---|---|---|---|---|
| A | $r_{A1}$ 55.132 | $d_{A1}$ | 11.18 | $N_{A1}$ | 1.6214 | $\nu_{A1}$ | 61.3 |
| | $r_{A2}$ −224.47 | $d_{A2}$ | 14.81 | | | | |
| | $r_{A3}$ −47.446 | $d_{A3}$ | 3.53 | $N_{A2}$ | 1.7174 | $\nu_{A2}$ | 29.4 |
| | $r_{A4}$ 71.402 | $d_{A4}$ | 14.86 | | | | |
| | $r_{A5}$ −61.164 | $d_{A5}$ | 5.88 | $N_{A3}$ | 1.72 | $\nu_{A3}$ | 50.3 |
| | $r_{A6}$ −24.427 | $d_{B0}$ | 3.53 | | | | |
| B | $r_{B1}$ −21.273 | $d_{B1}$ | 2.35 | $N_{B1}$ | 1.5407 | $\nu_{B1}$ | 46.8 |
| | $r_{B2}$ 58.824 | $d_{B2}$ | 11.76 | $N_{B2}$ | 1.72 | $\nu_{B2}$ | 50.3 |
| | $r_{B3}$ −66.968 | $d_{B3}$ | 0.12 | | | | |
| | $r_{B4}$ −1226.0 | $d_{B4}$ | 5.88 | $N_{B3}$ | 1.6935 | $\nu_{B3}$ | 53.4 |
| | $r_{B5}$ −72.0 | | | | | | |

Table 3

(Embodiment 3)

f = 100.0    $F_{No.} = 2.0$    $2\omega = 28°$

| | Radius of Curvature | | Axial Distance | | Refractive Index | | Abbe Number |
|---|---|---|---|---|---|---|---|
| A | $r_{A1}$ 71.0 | $d_{A1}$ | 8.24 | $N_{A1}$ | 1.713 | $\nu_{A1}$ | 53.9 |
| | $r_{A2}$ 298.0 | $d_{A2}$ | 0.12 | | | | |
| | $r_{A3}$ 38.382 | $d_{A3}$ | 11.76 | $N_{A2}$ | 1.67 | $\nu_{A2}$ | 57.1 |
| | $r_{A4}$ 69.065 | $d_{A4}$ | 2.94 | | | | |
| | $r_{A5}$ 126.921 | $d_{A5}$ | 3.76 | $N_{A3}$ | 1.733 | $\nu_{A3}$ | 28.4 |
| | $r_{A6}$ 30.84 | $d_{A6}$ | 17.65 | | | | |
| | $r_{A7}$ −44.129 | $d_{A7}$ | 2.35 | $N_{A4}$ | 1.6645 | $\nu_{A4}$ | 35.8 |
| | $r_{A8}$ 99.881 | $d_{A8}$ | 7.06 | $N_{A5}$ | 1.67 | $\nu_{A5}$ | 47.2 |
| | $r_{A9}$ −199.402 | $d_{A9}$ | 0.24 | | | | |
| | $r_{A10}$ 96.485 | $d_{A10}$ | 5.88 | $N_{A6}$ | 1.7106 | $\nu_{B1}$ | 43.3 |
| | $r_{A11}$ −46.007 | $d_{B0}$ | 5.88 | | | | |
| B | $r_{B1}$ −33.648 | $d_{B1}$ | 3.29 | $N_{B1}$ | 1.5762 | $\nu_{B2}$ | 41.4 |
| | $r_{B2}$ −61.806 | $d_{B2}$ | 0.12 | | | | |
| | $r_{B3}$ −225.224 | $d_{B3}$ | 5.88 | $N_{B2}$ | 1.6935 | $\nu_{B3}$ | 53.4 |
| | $r_{B4}$ −89.867 | | | | | | |

As it will be readily understood by those skilled in the optical arts the present invention is capable of many modifications and improvements within the scope and spirit thereof. Accordingly the invention is not intended to be limited by the specific disclosed embodiments but should be measured solely from the following claims.

What is claimed is:

1. A variable soft focus lens system comprising;
a first lens group having an image side surface convex to the image side, and
a second lens group at the image side of the first lens group having an object side surface concave to the object side whereby a meniscus shaped airspace is created between the object side surface of the second lens group and the image side surface of the first lens group, with at least the second lens group being movable along the optical axis relative to the first lens group for the purpose of variably adjusting a spherical aberration of the lens system, the meniscus shaped airspace being changed with the movement of the second lens group relative to the first lens group; the refractive power $\Phi_B$ of the second lens group being defined relative to the total refractive power $\Phi$ of the lens system by the following formula $$0.5\Phi > \Phi_B > -0.3\Phi.$$

2. The invention of claim 1, wherein the second lens group includes a negative meniscus lens component concave to the object side, the object side surface of the negative meniscus lens component forming the object side surface of the second lens group, and a positive lens component at the image side of the negative meniscus lens component, the positive lens component having a radius of curvature greater in absolute value on its object side surface than on its image side surface.

3. The invention of claim 2, wherein each of the negative meniscus lens component and the positive lens component in the second lens group is composed of a single lens element, respectively.

4. The invention of claim 2, wherein at least one of the negative meniscus lens component and the positive lens component in the second lens group comprises a cemented doublet lens.

5. The invention of claim 2, wherein the first lens group includes at least three lenses.

6. The invention of claim 5, wherein the first lens group comprises a Tessar type lens system.

7. The invention of claim 5, wherein the first lens group comprises a triplet type lens system.

8. The invention of claim 5, wherein the first lens group comprises a Gauss type lens system.

9. The invention of claim 2 wherein the first lens group is held stationary while the second lens group is moved along the optical axis for the purpose of variably adjusting the spherical aberration of the lens system.

10. The invention of claim 1, wherein the second lens group includes a first component having an object side concave surface serving as an object side surface of the second lens group and a second component separated from the first component at the image side thereof.

11. The invention of claim 10, wherein the first component is a negative meniscus lens and the second component is a positive lens in the second lens group.

12. A variable soft focus lens system comprising:
a first lens group having an image side surface convex to the image side, and
a second lens group at the image side of the first lens group having an object side surface concave to the object side whereby a meniscus shaped air space is created between the object side surface of the second lens group and the image side surface of the first lens group, with at least the second lens group being movable along the optical axis relative to the first lens group for the purpose of variably adjusting a spherical aberration of the lens system, the meniscus shaped air space being changed with the movement of the second lens group relative to the first lens group, wherein the second lens group includes a negative meniscus lens component concave to the object side, the object side surface of the negative meniscus lens component forming the object side surface of the second lens group, and a positive lens component at the image side of the negative meniscus lens component.

13. The invention of claim 12, wherein the positive lens component in the second lens group has a radius of curvature greater in absolute value on its object side surface than on its image side surface.

14. A variable soft focus objective lens system having a positive refractive power comprising:

a first lens group of a positive refractive power having an image side surface convex to the image side, and a second lens group of a positive refractive power located at the image side of the first lens group having an object side surface concave to the object side whereby a meniscus shaped air space is created between the object side surface of the second lens group and the image side surface of the first lens group, with at least the second lens group being movable along the optical axis relative to the first lens group for the purpose of variably adjusting a spherical aberration of the lens system, the meniscus shaped air space being changed with the movement of the second lens group relative to the first lens group.

* * * * *